United States Patent
Bertram et al.

(10) Patent No.: US 9,468,355 B2
(45) Date of Patent: Oct. 18, 2016

(54) AUTOMATIC DISHWASHER

(71) Applicant: Miele & Cie. KG, Guetersloh (DE)

(72) Inventors: Andre Bertram, Bielefeld (DE);
Tobias Dahms, Hannover (DE);
Michael Reilmann, Bielefeld (DE)

(73) Assignee: MIELE & CIE. KG, Guetersloh (DE)

( * ) Notice: Subject to any disclaimer, the term of this patent is extended or adjusted under 35 U.S.C. 154(b) by 75 days.

(21) Appl. No.: 14/187,350

(22) Filed: Feb. 24, 2014

(65) Prior Publication Data

US 2014/0238450 A1    Aug. 28, 2014

(30) Foreign Application Priority Data

Feb. 26, 2013  (DE) .................. 10 2013 101 861

(51) Int. Cl.
*A47L 15/00* (2006.01)
*A47L 15/42* (2006.01)
*A47L 15/48* (2006.01)

(52) U.S. Cl.
CPC ........ *A47L 15/0042* (2013.01); *A47L 15/4291* (2013.01); *A47L 15/483* (2013.01); *A47L 15/486* (2013.01); *A47L 15/488* (2013.01); *Y02B 30/52* (2013.01); *Y02B 40/44* (2013.01)

(58) Field of Classification Search
CPC ........... A47L 15/0042; A47L 15/4291; A47L 15/483; A47L 15/486; A47L 15/488; Y02B 30/52; Y02B 40/44

USPC ... 134/18, 25.2, 56 D, 57 D, 58 D, 105, 107
See application file for complete search history.

(56) References Cited

U.S. PATENT DOCUMENTS

| | | | |
|---|---|---|---|
| 2008/0264455 A1* | 10/2008 | Brewer et al. | 134/95.2 |
| 2009/0095330 A1* | 4/2009 | Iwanaga et al. | 134/95.2 |
| 2010/0043833 A1* | 2/2010 | Kim et al. | 134/25.2 |
| 2010/0083991 A1* | 4/2010 | Tolf | A47L 15/488 |
| | | | 134/95.2 |
| 2012/0167920 A1 | 7/2012 | Bertram et al. | |

FOREIGN PATENT DOCUMENTS

| | | |
|---|---|---|
| DE | 3418304 A1 | 11/1985 |
| DE | 4230576 A1 | 9/1994 |
| DE | 4330456 C1 | 3/1995 |
| DE | 102011000042 A1 | 7/2012 |
| EP | 1447042 A1 | 8/2004 |
| EP | 2047786 A1 | 4/2009 |
| JP | 2007125198 A | 5/2007 |
| WO | WO 2006080707 A1 | 8/2006 |

* cited by examiner

*Primary Examiner* — Michael Barr
*Assistant Examiner* — Levon J Shahinian
(74) *Attorney, Agent, or Firm* — Leydig, Voit & Mayer, Ltd.

(57) ABSTRACT

An automatic dishwasher includes a wash tub, a condensation dryer, and a heat pump device. The wash tub includes a washing compartment, the condensation dryer is adapted to supply outside air to a washtub wall, and the heat pump device is adapted to heat washing liquid. The heat pump device and the condensation dryer have a common fan.

7 Claims, 5 Drawing Sheets

AUTOMATIC DISHWASHER

CROSS-REFERENCE TO RELATED APPLICATIONS

Priority is claimed to German Patent Application No. DE 10 2013 101 861.0, filed on Feb. 26, 2013, the entire disclosure of which is hereby incorporated by reference herein.

FIELD

The invention relates to an automatic dishwasher, in particular configured as a domestic dishwasher, having a wash tub providing a washing compartment, a condensation dryer for supplying a wash tub wall with outside air and a heat pump device for heating washing liquid.

BACKGROUND

Automatic dishwashers of the aforementioned type are well known per se from the prior art. They have a wash tub which for its part provides a washing compartment. In the intended use case, the wash tub is used to hold the dishes to be cleaned.

The washing compartment provided by the wash tub is accessible on the user's part by way of a loading aperture. This can be sealed so as to be fluid-tight by means of a pivotably designed dishwasher door.

An automatic dishwasher has a spray device in the washing compartment to supply the dishes to be cleaned with washing liquid. This generally has two or three rotatably configured spray arms which in specified normal operation spray washing liquid conveyed by a circulating pump onto the dishes to be cleaned.

Electric heaters are typically used to heat the washing liquid. Moreover, DE 102011000042 A1 has disclosed a heat pump device for heating washing liquid, said device extracting heat from the outside air surrounding the automatic dishwasher for heating the washing liquid.

Automatic dishwashers known from the prior art typically have a condensation dryer for drying dishes after the completion of specified normal cleaning. In a possible embodiment, this dryer is used to supply a wash tub wall with outside air which leads to cooling of the wash tub wall with the result that moist air in the interior of the wash tub can condense inside on the wash tub wall that is cooled from outside. Thus humidity is removed from the air in the wash tub, which leads to drying of the dishes that are still hot at the end of a specified normal continuous wash program.

Although previously described automatic dishwashers have proven themselves in daily practice, there is a need for improvement, particularly with a view to a simplified construction which will help to reduce manufacturing and assembly costs.

SUMMARY

In an embodiment, the present invention provides an automatic dishwasher comprising a wash tub, a condensation dryer, and a heat pump device. The wash tub includes a washing compartment, the condensation dryer is adapted to supply outside air to a washtub wall, and the heat pump device is adapted to heat washing liquid. The heat pump device and the condensation dryer have a common fan.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
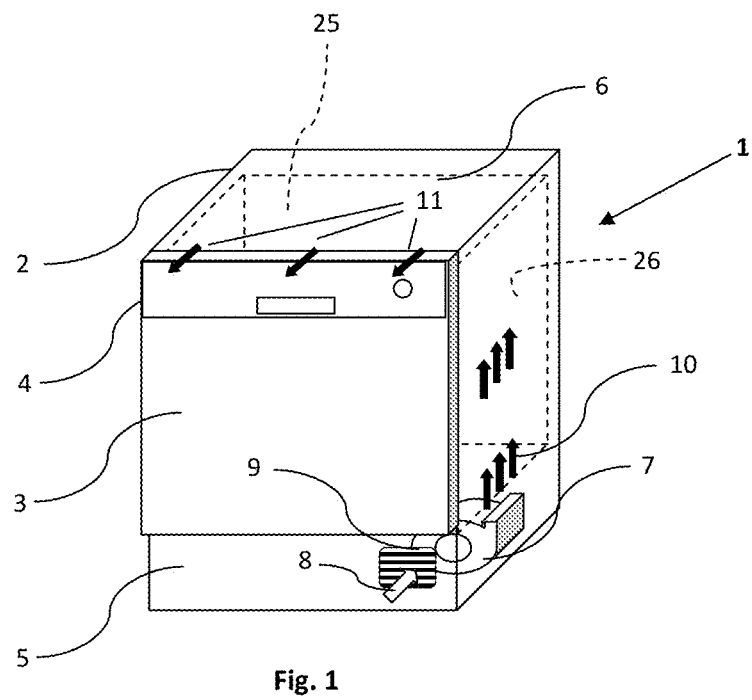
FIG. 1 shows an automatic dishwasher with a condensation dryer in a schematic perspective view.

An aspect of the invention provide an automatic dishwasher including the condensation dryer and the heat pump device having a common fan.

The condensation dryer known from the prior art has a fan. This is used in the drying case to suck in ambient air from outside and to direct it past the outside of a wash tub wall of the wash tub. The wash tub wall is thus cooled down, and in fact with the result that warm moist air inside the wash tub can condense inside on the cooled down wash tub wall.

In addition, the automatic dishwasher has a heat pump device which likewise has a fan. This is used to suck in ambient air from outside and to direct it through an evaporator for the purpose of heat transfer. Heating of the washing liquid is achieved with the heat pump device, said device extracting heat from the outside air surrounding the automatic dishwasher for heating the washing liquid.

In an embodiment of the invention, the condensation dryer and the heat pump device have a common fan, that instead of a first fan for the condensation dryer and a second fan for the heat pump device, the automatic dishwasher thus has a single fan that is suitable for and intended to be used both as a drying fan for the condensation dryer and also as a heat pump fan for the heat pump device. Instead of two fans, the automatic dishwasher according to the invention has only a single fan.

The configuration according to an embodiment of the invention is advantageous in so far as a second fan can be dispensed with completely. This brings a cost saving both in the manufacture, due to the reduction in components achieved, and also in the assembly. Moreover, it is advantageous that by omitting one fan there is additional installation space available inside the automatic dishwasher, for the heat pump device for example, which enables an optimised design of the same.

According to one embodiment, the fan provided according to the invention is hydraulically connected downstream of an evaporator of the heat pump device. Accordingly, outside air sucked in by the fan first passes the evaporator which is hydraulically connected upstream of the fan on the dishwasher side. When the heat pump device is switched on, the outside air is cooled in the evaporator. When the heat pump device is switched off, the outside air sucked in flows through the evaporator without a change in temperature.

An air switchover device is preferably connected downstream of the fan in the flow direction of the air sucked in. By means of this air switchover device, the air sucked in can be fed into a first and/or a second flow path. According to the first flow path, the air is conducted out of the automatic dishwasher; for this the automatic dishwasher has air discharge openings, preferably air discharge openings formed on the side and/or on the rear wall of the automatic dishwasher. This flow path is typically available when the heat pump device is in operation, i.e. during heating of the washing liquid by means of said heat pump device. The outside air cooled down as a result of heating the washing liquid in the evaporator is discharged by way of the first flow path and directed out of the automatic dishwasher. The second flow path, meanwhile, is used during condensation drying after completion of a specified normal continuous cleaning program. In this case, the outside air sucked in via the fan is not directed out of the automatic dishwasher via the air outlets. Rather a change in direction of the outside air takes place inside the automatic dishwasher, as a result of which said air flows past the outside of a wash tub wall of the wash tub for the purpose of cooling said wall.

Alternatively to what has been described previously, it can also be provided that both flow paths are at least partially open at the same time, thus the air conveyed by the fan is discharged both by way of the first flow path through the air discharge openings formed in particular on the side and/or on the rear wall of the automatic dishwasher, and is also directed by way of the second flow path past the outside of a wash tub wall. In this case, the ratio of the air quantities divided between the two flow paths is preferably adjustable and can be freely selected, for example depending on the desired cooling effect of the wash tub wall.

The air switchover device preferably has an air flap with which a flow path, in particular the second flow path, can be optionally opened or closed, in particular the air flap can be pivotably designed. There may also be two air flaps present, namely an air flap of this kind for each of the first and second flow paths. Alternatively, there may only be one air flap present which is assigned to both flow paths and which uncovers the second flow path when the first flow path is closed and vice versa.

The use according to an embodiment of the invention of only one fan additionally fulfils the advantage on the process side that, with a heat pump device which is otherwise switched off, the fan is permitted to run on for the purpose of drying the evaporator of said heat pump device which may still be damp due to condensate. In this case, such drying of the evaporator preferably takes place when the fan is already operating for the purpose of condensation drying. The use of only one fan thus offers a synergistic effect in that, on the one hand, drying of the evaporator is achieved by conveying the air, and also, on the other hand, condensation drying of the dishes is achieved by cooling of a wash tub wall. This synergistic effect does not emerge in automatic dishwashers previously known from the prior art.

Regardless of the automatic dishwashers previously described, a method for operating an embodiment of an automatic dishwasher equipped with a heat pump device is therefore proposed with the invention on the process side, in which method washing liquid is heated in a condenser in a heating phase and the outside air cooled for this purpose in an evaporator is discharged by means of a fan, and in which method the fan continues to be operated in a drying phase with a heat pump device that is otherwise switched off.

When implementing the method according to the invention, specified normal operation of the heat pump device takes place in a manner known per se, and accordingly there is cooling of ambient air sucked in from outside. This cooled ambient air is conducted away by means of the fan. As soon as the washing liquid has been heated in the specified way by means of the heat pump device, the heat pump device is switched off. According to the invention, it is then provided that the fan of said heat pump device continues to operate with the heat pump device otherwise switched off. It is thus achieved in an advantageous manner that outside air sucked in from outside still continues to be directed through the evaporator. This leads advantageously to any condensate that may have collected in the evaporator being carried away by the outside air passing through, that is to say drying of the evaporator is achieved. It is thus ensured that there is no microbial contamination of the evaporator due to residual moisture with associated unpleasant odour. Rather, implementation of the method according to the invention ensures that the evaporator is dried following specified normal use.

According to another feature of the invention, the first drying phase is followed by a further drying phase, a wash tub wall being supplied in the further drying phase with outside air conveyed by the fan. According to this further drying phase, condensation drying of the dishes accommodated by the wash tub thus takes place in a manner known per se.

An air switchover device is connected downstream of the fan in the flow direction of the outside air; by means of which device the outside air conveyed by the fan is optionally distributed to different flow paths according to a further feature of the invention. Distribution of the outside air conveyed by the fan to a first and/or a second flow path generates the advantages already explained previously.

The fan can preferably be operated at a first speed and at a lower, in particular a significantly lower speed compared to the first speed, in particular the fan is speed-controllable. The fan is run during operation of the heat pump device, that is in a washing liquid heating phase, at the first speed, a volumetric flow of at least 50 m3/h being delivered. With the heat pump device switched off, that is during the first and/or the second drying phase, the fan is operated by comparison at reduced speed which ensures particularly energy-efficient operation of the automatic dishwasher.

Further features and advantages of the invention will become apparent from the following description based on the figures.

FIG. 1 shows an automatic dishwasher 1 configured as a domestic dishwasher in a schematic perspective view.

The automatic dishwasher 1 has an outer housing 2. This accommodates a wash tub 25 which provides a washing compartment 6. The wash tub 25 is accessible from the front by means of a loading aperture which can be sealed so as to be fluid-tight by means of a pivotably arranged door 3.

The door 3 has a faceplate 4 at the top in relation to the drawing plane according to FIG. 1. Provided below the door 3 is a plinth area 5 which provides an air inlet 9 for outside air, that is to say ambient air 8.

Figure 2:
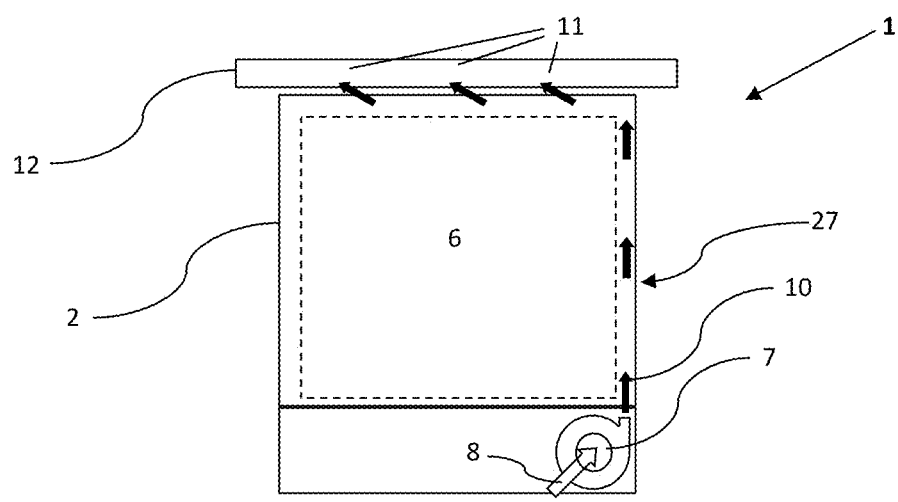
FIG. 2 shows the automatic dishwasher according to FIG. 1 in a schematic front view.

Above the outer housing 2 in the finally assembled state is a covering panel 12, arranged, for example, in the form of a worktop as can be seen in particular from the diagram according to FIG. 2.

The automatic dishwasher 1 has a condensation dryer 27. This has a fan 7 which sucks in outside air 8 via the air inlet 9. The outside air 8 that is sucked in is directed as air flow 10 past the wash tub wall 26 of the wash tub 25 and is re-released to the atmosphere surrounding the automatic dishwasher 1 at the top of the wash tub 25 as exhaust air 11. There, the exhaust air 11 heated by flowing past the warm wash tub can be used in particular to preheat an adjacent kitchen worktop and to provide an air cushion which prevents water vapours that escape when the wash tub 3 is opened from condensing on the kitchen worktop.

In the intended use case, rinsing takes place as the conclusion of a cleaning program. The washing liquid and therefore also the dishes accommodated by the wash tub 25 are heated in the process to 55° C. for example. The surface tension of the washing liquid is reduced by adding a rinse aid. The washing liquid is pumped away at the end of rinsing. In a draining phase, residual moisture can drip off or run off the dishes and the baskets for holding dishes that are located in the wash tub which is promoted by the low surface tension. The inherent heat of the dishes causes the water film still remaining to evaporate. As a result, the washing compartment air gradually becomes saturated with water vapour. If the washing compartment air is saturated, no further water can dry off the dishes and the baskets. To decrease the humidity in the washing compartment air and therefore to make it absorptive again, a wash tub wall 26 of the wash tub 25 is cooled with an air flow 10 in the manner already described previously. The temperature of the wash tub wall 26 drops and as a result falls below the dew point of the moist washing compartment air. The water vapour in the saturated washing compartment air can condense on the washing compartment wall 26. The washing compartment air is no longer saturated and can therefore absorb moisture again.

Figure 3:
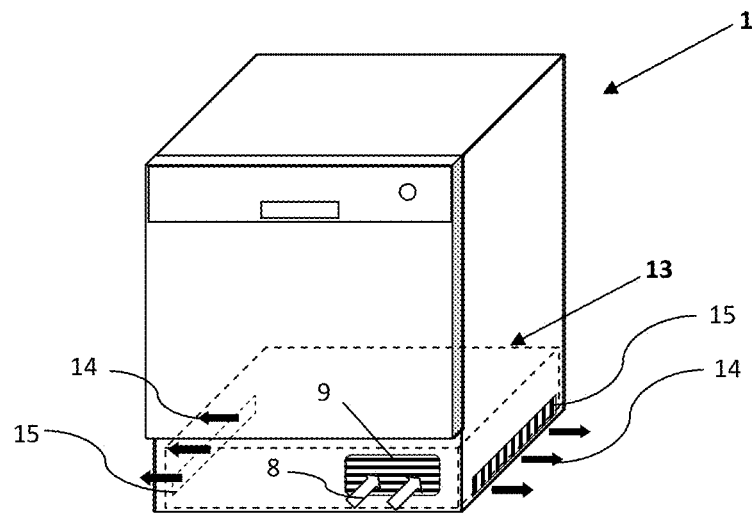
FIG. 3 shows an automatic dishwasher with a heat pump device in a schematic perspective view.
Figure 4:
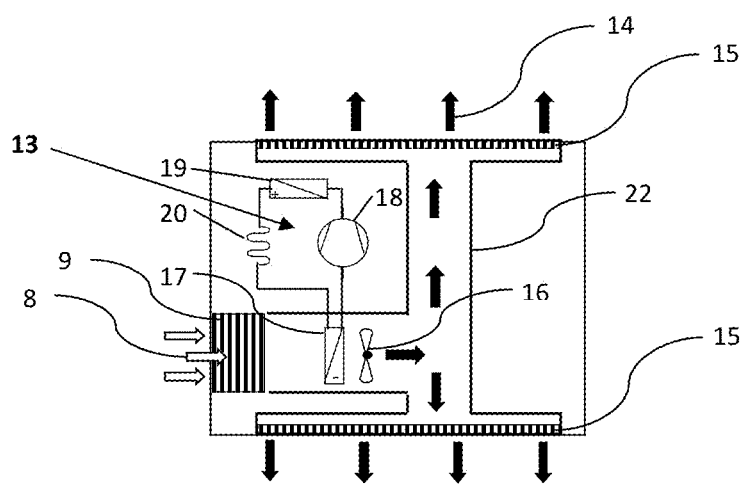
FIG. 4 shows the heat pump device of the automatic dishwasher according to FIG. 3 in a schematic plan view from above.

FIGS. 3 and 4 show an automatic dishwasher 1 equipped with a heat pump device 13.

The heat pump device 13 essentially has four components which are joined together hydraulically by way of a pipe system in which a working medium (refrigerant) flows. In the flow direction of the refrigerant, the individual components are arranged such that it flows first through an evaporator 17, then through a compressor 18 and finally through a condenser 19. Subsequently, the refrigerant flows through an expansion device 20 (throttling point) before being fed back again to the evaporator 17.

To operate the heat pump circuit, liquid refrigerant is first sprayed into the evaporator 17. Due to the low pressure of the refrigerant in the evaporator 17, the refrigerant can evaporate at low temperatures. Subsequently, the compressor 18 sucks in the gaseous refrigerant at low pressure and compresses it to a high pressure. The refrigerant becomes hot in the process. As a result, the refrigerant contains approximately the sum of the evaporation energy and the drive energy of the compressor 18. This energy is re-released inside the condenser 19. This occurs due to condensing of the refrigerant. Finally, the liquid refrigerant is expanded to a low pressure using the throttling point 20 such that it can evaporate again in order to flow through the heat pump circuit another time.

So that this heat pump circuit functions, thermal energy must be made available to the evaporator and heat must be removed from the condenser. In the process, the evaporator, as described previously, obtains the thermal energy necessary to evaporate the refrigerant by cooling down supply air (i.e. ambient air) while the condenser releases the thermal energy to washing liquid of the dishwasher.

A fan 16 is used to supply the evaporator 17 with outside air 8, said fan being connected downstream of the evaporator 17 in the flow direction of the outside air 8, as can be seen in particular from the diagram according to FIG. 4. The outside air 8 which is cooled down after passing the evaporator 7 then arrives via an air duct 22 at air outlets 15 on the side of the automatic dishwasher 1, through which outlets the cooled ambient air 8 exits the automatic dishwasher 1 as exhaust air 14.

As a result of cooling down the outside air 8 during specified normal operation of the heat pump device 13, the humidity in the air may condense and may be precipitated and collect in the evaporator 17, in the air duct 22 and in the fan 16. This accumulating condensate is collected in a drip pan provided for this purpose and is either discarded or used in a wash process.

It is a problem even in specified normal operation of the heat pump device 13 that the surfaces of the evaporator 17 (tubes and fins) are wetted with moisture after switching off the heat pump device 13. Even parts of the air duct 22 or the fan 16 can exhibit moisture at the end of the program. It is not completely possible for the surfaces to dry on their own in a virtually sealed outer housing.

Particularly during long periods of inactivity, bacteria, germs and/or similar adhesions may develop because of the surfaces wetted with moisture. They may result in an undesirable odour formation which on the user's part is deemed to be unpleasant and consequently unfavourable.

Figure 5:
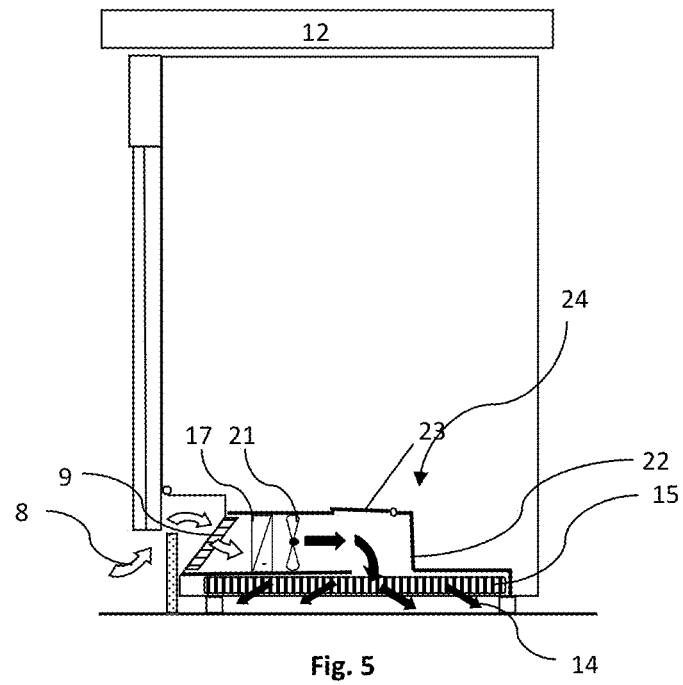
FIG. 5 shows an automatic dishwasher according to the invention with a heat pump device in a heating phase in a schematic lateral view.
Figure 6:
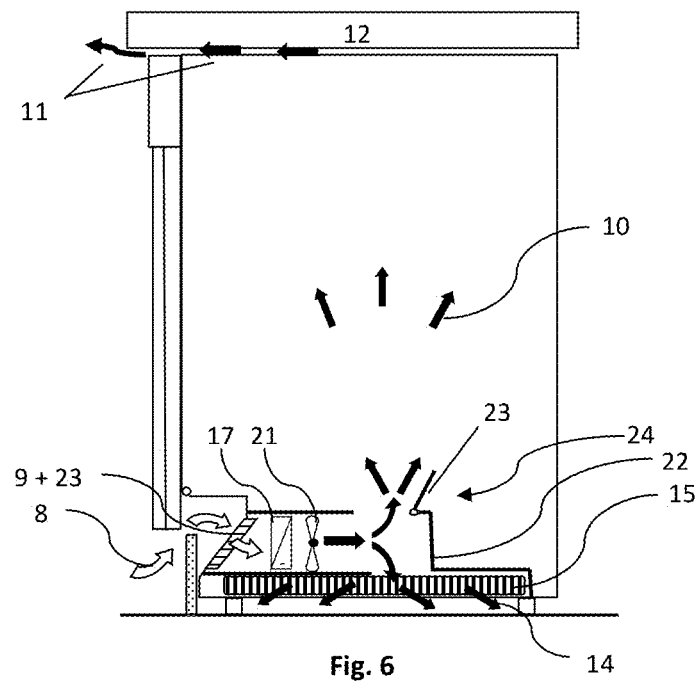
FIG. 6 shows an automatic dishwasher according to the invention with a heat pump device in a drying phase in a schematic lateral view.
Figure 7:
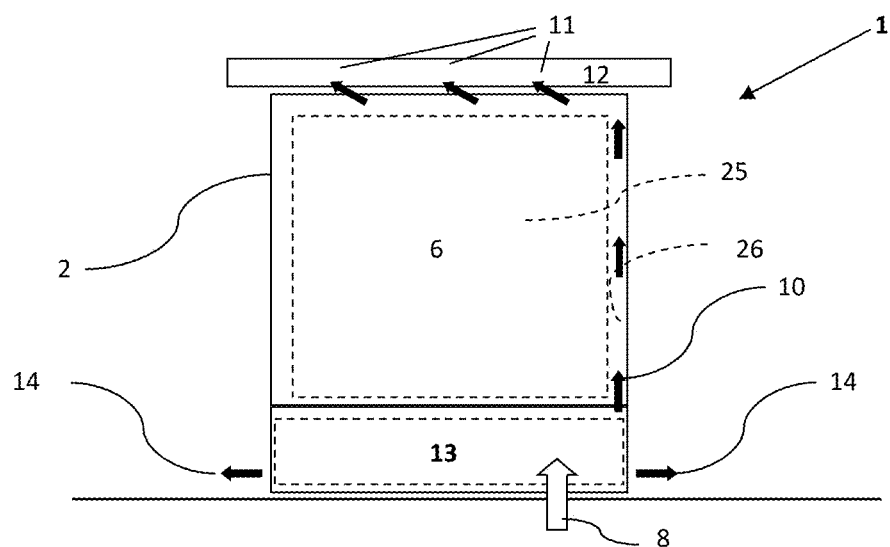
FIG. 7 shows the automatic dishwasher according to FIG. 6 in a schematic front view.

FIGS. 5, 6 and 7 show an automatic dishwasher 1 designed in a manner according to the invention, its special feature being that, instead of a first fan 7 for the condensation dryer 27 and a second fan 16 for the heat pump device 13, only a single fan 21 is provided which as a common fan is provided for both the condensation dryer 27 and also the heat pump device 13. In this case, the fan 16 provided by the heat pump device 13 can preferably be used as common fan 21.

An air switchover device 24, which in the embodiment shown has a twistably arranged air flap 23, is connected downstream of the common fan 21 in the flow direction. A gate valve and/or comparable element may be provided instead of such an air flap 23. It is crucial that by means of the air switchover device 24 the outside air 8 sucked in by the fan 21 can be directed past the wash tub wall 26 as air flow 10 and/or can be directed to the air outlet 15 as exhaust air 14, as emerges in particular by looking at FIGS. 5 and 6 together. In particular, this configuration has the advantage that it is possible to dispense with a conventional drying fan. In addition to cost saving, this has the added advantage that there is more installation space available for the heat pump device 13.

When operating heat pump device 13, washing liquid is heated during a heating phase by the condenser 19 and the cooled ambient air 14 is directed out of the automatic dishwasher 1 by way of an air outlet 15. After switching off the compressor 18, the air duct 22, the fan 21 and the evaporator 17 are still partially wetted with moisture. To dry these wet components, it is provided according to the invention to leave the fan 21 switched on with the heat pump device 13 otherwise switched off or to switch it back on during a later section of the program. The ambient air 8 which is then no longer cooled in the evaporator 17 can absorb residual moisture and thus dry the air duct 22, the evaporator 17 and the fan 21. At the same time, the airway of the ambient air conveyed by the fan 21 remains the same as during a heating phase, that is to say with the heat pump device 13 switched on.

A switchover of the airway can take place by means of the air switchover device 24 already described previously. This renders it possible in spite of drying fan 7 no longer being present, unlike in the prior art, to implement condensation drying in that the air conveyed in particular by fan 21 is conducted past the wash tub wall 26 as airflow 10.

As can be seen from the illustration in FIGS. 5 and 6, it is preferable to fit the air duct 22 with a pivotable air flap 23. This air flap 23 may be constructed close to the wash tub wall 26. The air flap 23 has a drive; for example a wax element, a servomotor, a shape memory metal and/or similar can be used for this. In this case, it may either be provided that only the one or the other airway or that both airways are supplied equally with outside air 8.

Typically, a volumetric flow of 50-150 $m^3/h$, preferably 70 $m^3/h$, is delivered by the fan during a heating phase of the heat pump device, while for condensation drying a lower volumetric flow (10-50 $m^3/h$, preferably 30 $m^3/h$) is typically adequate. Each of the volumetric flows can be achieved by adjusting an appropriate ratio of the two airways or by controlling the speed of the fan 21.

Figure 8:
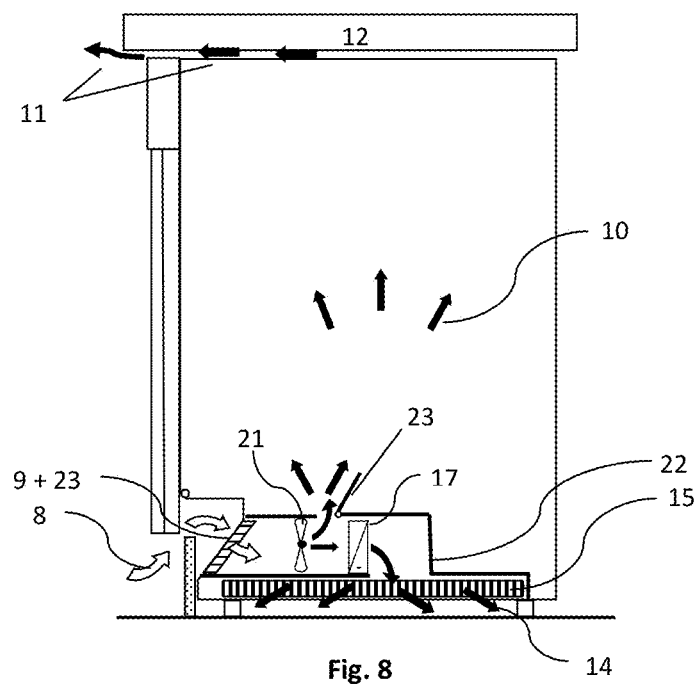
FIG. 8 shows a further configuration with the fan hydraulically connected upstream of the evaporator in a schematic lateral view

In a further configuration, the fan 21 provided can also be hydraulically connected upstream of the evaporator 17, as disclosed in FIG. 8. When the flap 23 is closed, the heat pump device 13 is in the heating phase, the entire air flow being directed through the evaporator 17. When the flap 23 is open (as illustrated in FIG. 8), a partial volumetric flow is directed over the wash tub wall for condensation drying in the drying phase. The second partial volumetric flow is used to dry the evaporator.

Figure 9:
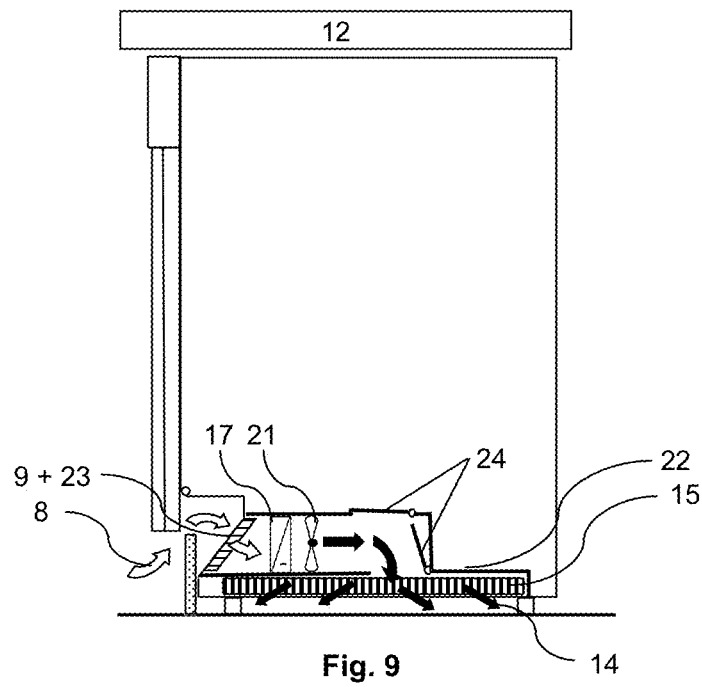
FIG. 9 shows a further configuration of the airway switchover according to the invention with a heat pump device in a heating phase.
Figure 10:
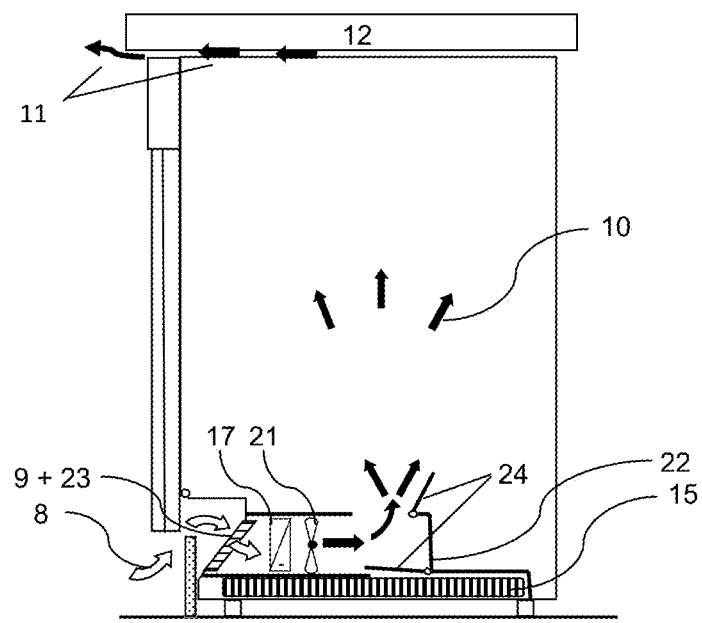
FIG. 10 shows a further configuration of the airway switchover according to the invention with a heat pump device in a drying phase.

As illustrated in FIGS. 9 and 10, the air switchover can also be implemented using several air flaps 23. It is also conceivable to operate several air flaps 23 via only one actuator. This may be implemented, for example, by means of lever mechanisms known to the person skilled in the art.

A possible process sequence is as follows:

First of all, the washing liquid is heated by means of the heat pump device 13. The compressor 18 of the heat pump device 13 is switched off when heating has taken place. The other wash phases, such as intermediate rinsing or final rinsing, are implemented with or without heating phases. With compressor 18 of the heat pump device 13 switched off, fan 21 is switched on resulting in drying of the fan 21, the air duct 22 and the evaporator 17. In a further drying step, drying of the cleaned dishes by condensation drying then starts up, for the purpose of which the second airway is opened and the outside air 8 conveyed by the fan 21 is directed past the wash tub wall 26 as air flow 10. According to an alternative implementation, when both flow paths are opened simultaneously, drying of the dishes by condensation drying and drying of the evaporator 17, fan 21 and air duct 22 can take place at the same time.

Overall, with the configuration according to the invention, this results in installation space and cost advantages, as a combined fan 21 is used for both the heat pump device 13 and also for the condensation dryer 27. Moreover, it is also possible by implementing the process to achieve savings in time and energy, as simultaneous drying of both dishes and also evaporator 17, fan 21 and air duct 22 can take place.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 automatic dishwasher
2 outer housing
3 door
4 faceplate
5 base area
6 washing compartment
7 fan
8 outside air (ambient air)
9 air inlet
10 air flow
11 exhaust air
12 cover plate
13 heat pump device
14 exhaust air
15 air outlet
16 fan
17 evaporator
18 compressor
19 condenser
20 expansion device
21 fan
22 air duct
23 air flap
24 air switchover device
25 wash tub
26 wash tub wall
27 condensation dryer

What is claimed is:

1. An automatic dishwasher comprising:
a wash tub including a washing compartment;
a condensation dryer adapted to supply air from outside of the automatic dishwasher to a wall of the wash tub;
a heat pump device adapted to heat washing liquid, a fan common to the heat pump device and the condensation dryer being adapted to draw in air from outside the automatic dishwasher toward an evaporator of the heat pump device; and an air switchover device adapted to distribute the air drawn in by the common fan from outside the automatic dishwasher to at least one of a first flow path leading outside of the automatic dishwasher to the evaporator of the heat pump device or a second flow path along an outside of the wall of the wash tub, wherein the second flow path provides thermal contact of the air therein with the outside of the wall for a distance along the outside of the wall so as to provide cooling of the wall, the air therein being separate from an inside of the wash tub.

2. The automatic dishwasher recited in claim 1, wherein the air switchover device includes a pivotable air flap.

3. The automatic dishwasher recited in claim 1, wherein the fan is downstream of the evaporator of the heat pump device.

4. A method for operating an automatic dishwasher equipped with a heat pump device, the automatic dishwasher including a wash tub with a washing compartment, the wash tub having at least one wall, the method comprising:

heating washing liquid in a condenser during a heating phase;

drawing in air from outside the automatic dishwasher toward an evaporator of the heat pump device using a fan;

cooling the air from outside the automatic dishwasher in the evaporator;

conveying the air from outside the automatic dishwasher using the fan to at least one of a first flow path leading outside of the automatic dishwasher to the evaporator of the heat pump device or a second flow path along an outside of the at least one wall of the wash tub via an air switchover device, wherein the second flow path provides thermal contact of the air therein with the outside of the at least one wall for a distance along the outside of the at least one wall so as to provide cooling of the at least one wall, the air therein being separate from an inside of the wash tub; and continuing to operate the fan during a first drying phase while the heat pump device is switched off.

5. The method recited in claim 4, wherein conveying air to the at least one wall of the wash tub comprises a second drying phase.

6. The method recited in claim 5 further comprising operating the fan at a reduced speed compared to a speed of the fan in the heating phase during at least one of the first drying phase or the second drying phase.

7. The method recited in claim 4, wherein the air switchover device is downstream of the fan.

* * * * *